R. KROEDEL.
FOCUSING DEVICE.
APPLICATION FILED OCT. 5, 1908.

937,077.

Patented Oct. 19, 1909.
2 SHEETS—SHEET 2.

UNITED STATES PATENT OFFICE.

ROBERT KROEDEL, OF ROCHESTER, NEW YORK, ASSIGNOR TO EASTMAN KODAK CO., OF ROCHESTER, NEW YORK, A CORPORATION OF NEW YORK.

FOCUSING DEVICE.

937,077.  Specification of Letters Patent.  Patented Oct. 19, 1909.

Application filed October 5, 1908. Serial No. 456,145.

*To all whom it may concern:*

Be it known that I, ROBERT KROEDEL, of Rochester, in the county of Monroe and State of New York, have invented certain new and useful Improvements in Focusing Devices; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple, cheap, convenient and efficient form of focusing device for the latter and analogous instruments through the influence of which the relative positions of the parts that enter into the focusing operation may be accurately fixed for an estimated focus by a preliminary adjustment of the device and such positions thereafter quickly and positively assumed by the said part or parts.

A further object of my invention is to compensate, in the focusing adjustment for the differences in position of the sensitized material when the device is used in connection with a camera adapted to accommodate sensitized sheets in two or more different planes as illustrated by a film camera having a plate adapter.

To these and other ends the invention consists in certain improvements and combinations of parts all as will be hereinafter more fully described, the novel features being pointed out in the claims at the end of the specification.

Figure 1:
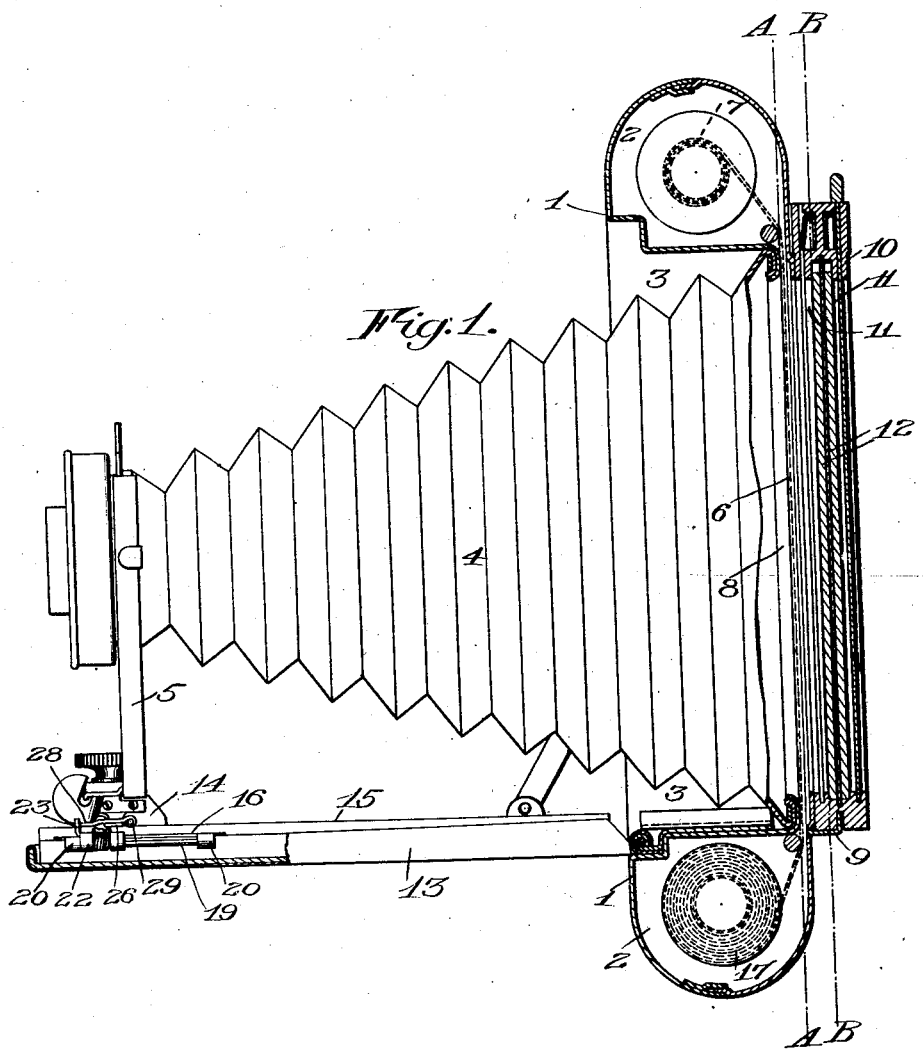
Figure 2:
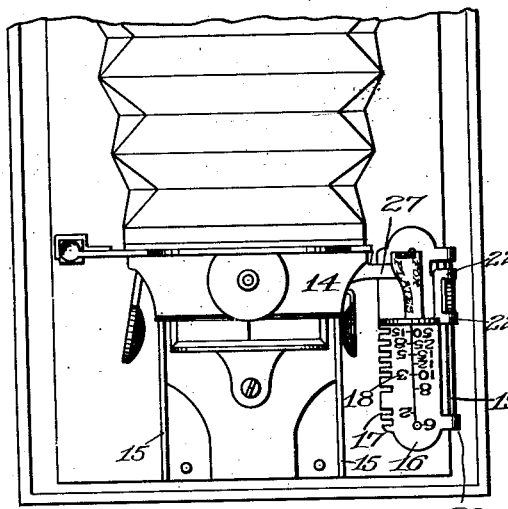
Figure 3:
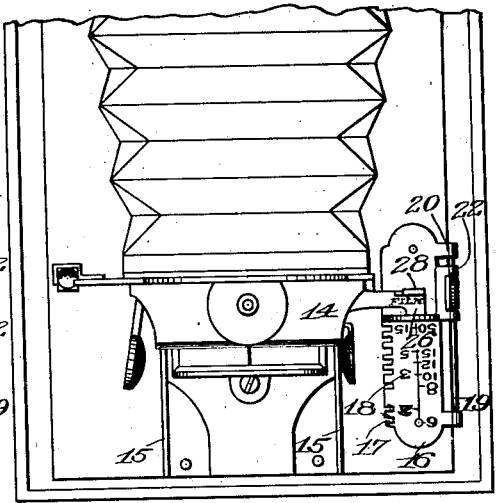
Figure 4:
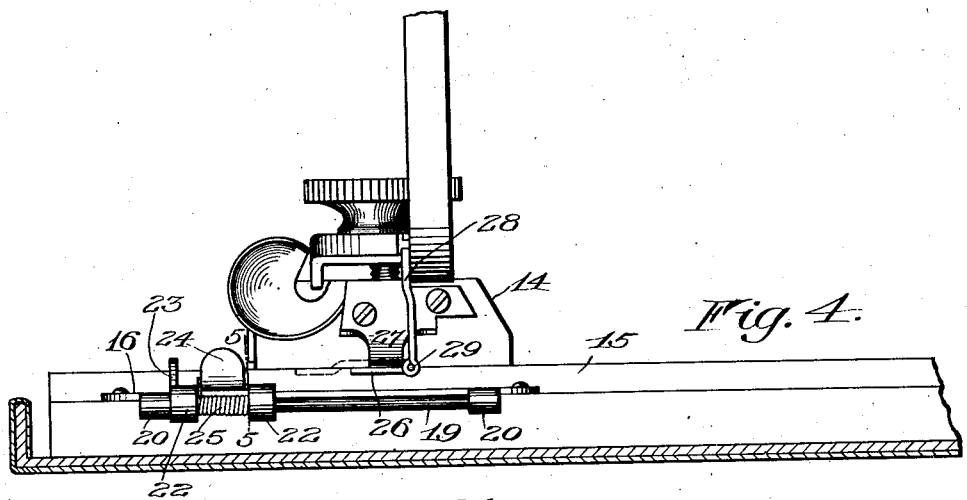
Figure 5:
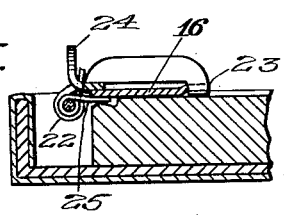

In the drawings: Figure 1 is a longitudinal central vertical section through a folding camera in extended position, the same being provided with focusing devices constructed in accordance with and illustrating one embodiment of my invention. The extended parts of the camera are shown in side elevation with the exception of a portion of the bed that is shown in section to reveal the focusing stop and its mounting; Fig. 2 is a top plan view of a portion of the camera bed and of the focusing device; Fig. 3 is a similar view with the focusing device in a different position of adjustment; Fig. 4 is an enlarged side elevation of the focusing device and camera front or lens carriage being a section through a portion of the camera bed; and Fig. 5 is a transverse detail section through the focusing device on the line 5—5 of Fig. 4.

Similar reference numerals indicate similar parts.

The camera to which I have, in the present instance, shown my improved focusing devices attached is of what is known as a "folding pocket" type embodying a body-portion 1 comprising the film chambers 2 and an intermediate chamber 3 within which the bellows 4 and front 5 are adapted to be housed when the camera is in its folded state. The film 6 is wound between film rolls 7 and 17 located in the chambers 2 and passed across an exposure opening 8 at the rear of the camera. The present camera is also fitted with a supporting flange 9 on the back whereby it is adapted to accommodate a plate holder 10 of any preferred type, the present one being provided with two plate chambers 11 for the reception of the plates 12. The latter register with the exposure opening 8 in rear of the position of the film 6 and may be used as desired to receive and record the image by withdrawing the film, all as is well understood in the art. The chamber 4 is closed when the camera is folded by the usual door 13 which when extended forms a bed for the front 5 carrying the lens or its equivalent. The front includes a carriage 14 that slides longitudinally of the bed on a track or way 15 to which it may be secured and in relation to which it may be adjusted in any preferred manner.

Preferably at the side of the track 15 I apply to the bed 13 a plate 16 having a series of notches 17 in one edge thereof that form a plurality of engaging portions spaced or graduated to correspond with the relative distances the carriage and front must be moved to or from the sensitized material to bring in focus objects at different estimated distances, the said plate thus forming a scale which may be read by indicia 18 placed adjacent to the graduations thereon. The latter preferably run parallel with the track and hence with the path of movement of the carriage and also preferably arranged parallel therewith is a guide comprising in the present instance a bar 19 supported upon ears 20 on the opposite edge of the plate 16.

Slidable on the bar and also rotatable thereon to a limited degree as an axis is an adjustable stop that is movable parallel with the path of movement of the carriage in cooperative relation with the scale 16 and comprises in the present instance a barrel portion or sleeve 22 fitting the guide and a locking portion 23 (Fig. 5) that engages or is disengaged from the various notches or graduations 17 by a lateral rotary or rocking and a longitudinally sliding movement of the stop, an operating portion 24, being preferably provided on the barrel 22' to offer convenience to the operator's fingers during such manipulation. The said stop is normally held in coöperation with the scale and given a tendency to engage the notches 17 through the influence of a spring 25 encircling the bar 19 and having its opposite ends engaging the stop and plate respectively.

The carriage 14 is provided with an abutment 26 formed in the present instance by an arm 27 that projects laterally a sufficient distance to traverse the scale 16 and include in its path the stop 21. The indicia or characters 18 are usually given in units of distance and the scale plate 16 having been originally positioned on the camera bed in accordance with suitable tests of the lens used in connection with that particular camera, all the operator has to do to focus his instrument is to set the stop 21 at the graduation corresponding to his estimate of the distance at which the object lies and pull out the carriage as far as it will go, that is, until the abutment 26 engages and is arrested by the stop.

We will assume for convenience that the adjustment just described brings the focal plane of the lens into coincidence with the plane of the film 6 as indicated by the line A—A in Fig. 1 of the drawings. It will therefore be seen that when the plates 10 are used, this adjustment will be improper because, as before mentioned, the plate that is in position for exposure is in a plane B—B in rear of the plane A—A and consequently beyond the focal plane of the lens. To compensate for this difference and make the reading of the scale true in either case, I arrange upon the carriage 14 a second abutment 28 that engages the stop in advance of the other and halts the carriage at an earlier point in its outward travel making the distance between the lens and the plane B—B the same as the distance from the lens to the plane A—A when the other abutment is in use. The distance between the abutments, when in operative positions should therefore be, in most cases, equal to the degree of separation of the planes A—A and B—B of the respective sensitized materials. The abutment 28 is, in the present instance, formed by a finger pivoted at 29 to the arm 27 and movable to the two positions shown in dotted lines in Fig. 4, the latter position bringing it in the line with abutment 26 and into operative relation with respect to the stop 21, the abutment 26 being thus rendered inoperative, and the full line position being that occupied when the abutment 26 is to be made effective.

It will be noted that both abutments traverse the scale 16 to read directly thereon and the focal position of the carriage may thus be recorded without coöperation of the stop. This advantage has bearing, for instance, when a focusing screen is being used either to test the correctness of the focusing device or to judge the distances of objects. It will also, of course, be understood that the focusing devices may be applied in substantially the same manner in cameras in which the focusing is done through the relative movement of a fixed lens and movable sensitized material or screen instead of the reverse as herein shown. Moreover, as the coöperating elements on the carriage or front and the camera bed combine to indicate and control the relative movement and adjustment of these parts, it is obvious that substantially identical results would be accomplished in substantially the same manner by interchanging the locations of the said elements as herein shown, all without departing from the spirit of my invention.

I claim as my invention:

1. In a focusing device, the combination with a camera bed and a carriage movable thereon, one of said members being provided with a scale graduated in units of focal distance extending parallel with the path of movement of the carriage and the other with an abutment, of a stop movable on the scale carrying member to coöperate and register with the different graduations of the scale and adapted to be engaged by the abutment on the other member at the different points of register.

2. In a focusing device, the combination with a camera bed and a carriage movable thereon, one of said members being provided with a scale graduated in units of focal distance and the other with an abutment, of a stop movable on the scale carrying member parallel with the scale and in the path of the abutment on the other, said stop being arranged to coöperate with the scale and means for locking the stop at different points on the latter.

3. In a focusing device, the combination with a camera bed and a carriage movable thereon, one of said members being provided with a scale graduated in units of focal distance and the other with an abutment, of a guide on the scale carrying member extending parallel with the path of movement of the carriage and an adjustable stop on the guide arranged in the path of the abutment on the other member to coöperate with the scale and movable into register with the different graduations thereof, selectively.

4. In a focusing device, the combination with a camera bed and a carriage movable thereon, one of said members being provided with a scale graduated in units of focal distance, the other with an abutment, of a guide on the scale carrying member extending parallel with the path of movement of the carriage and an adjustable stop on the guide arranged in the path of the abutment on the other member to coöperate with the scale and having a locking engagement therewith at each graduation.

5. In a focusing device, the combination with a camera bed and a carriage movable thereon, one of said members being provided with an abutment, and the other with a graduated scale extending parallel to the path of movement of the carriage, of an adjustable stop on the scale carrying member movable longitudinally of the scale and adapted to be engaged by the abutment on the other member and to interlock with the scale at the several graduations thereof, selectively, by a lateral movement relatively thereto.

6. In a focusing device, the combination with a camera bed and a carriage movable thereon, one of said members being provided with an abutment and the other with a graduated scale, of a guide on the scale carrying member extending parallel to the path of movement of the carriage and an adjustable stop slidable on the guide longitudinally of the scale and rotatable thereon into interlocking coöperation with the graduations on the scale.

7. In a focusing device, the combination with a camera bed and a carriage movable thereon, one of said members being provided with an abutment, of a plate secured to the other having a series of engaging portions, a bar on said plate extending parallel with the path of movement of the carriage and a stop mounted to slide on the bar in the path of the abutment on the other member and to interlock by a lateral rotary movement with the several engaging portions of the plate, selectively.

8. In a focusing device, the combination with a camera bed and a carriage movable thereon, one of said members being provided with an abutment, of a plate secured to the other having a series of notches therein forming engaging portions, a guide bar supported on the plate to extend parallel with the path of relative movement of the members, an adjustable stop slidably mounted on the guide bar in the path of the aforesaid abutment and rotatable thereon into and out of engagement with the notches of the plate, selectively, and a tension member normally operating to press the stop into such engagement.

9. In a focusing device, the combination with a camera bed and a carriage movable thereon, one of said members being provided with an abutment, of a scale graduated in units of focal distance on the other and an adjustable stop arranged in the path of the aforesaid abutment and coöperating with the scale, the said abutment being adapted to engage the stop and to traverse the graduations of the scale.

10. The combination with a camera adapted to accommodate sensitized materials in different parallel planes and embodying a bed, of a front movable on the bed toward and from the planes of the sensitized materials, a stop on one of said last mentioned members and two relatively movable abutments on the other, one having an operative position in advance of the other, adapted to selectively engage the stop to halt the front at either of two predetermined points and bring the focal plane of the camera in coincidence with either of the planes of the sensitized materials.

11. In a focusing device, the combination with a camera bed and a carriage movable thereon, of a stop pivotally mounted on one of said members to rotate into and out of position for engagement with the other, said stop being adjustable longitudinally of its axis in parallelism to the path of relative movement of the members.

12. In a focusing device, the combination with a camera adapted to accommodate sensitized material in different planes and embodying a bed and a front movable relatively to the bed toward and from said planes, of coöperating elements on the said relatively movable members, respectively, for halting the front at different distances from one of the sensitized materials with the latter in the focal plane of the camera, one of said elements constituting an adjustable stop, means carried with one element and movable relatively to both coöperating with the stop and front to halt the latter with the focal plane of the camera coincident with the other sensitized material and a scale with which the stop adjustably coöperates to indicate the focal distance of the camera with regard to either sensitized material.

ROBERT KROEDEL.

Witnesses:
RUSSELL B. GRIFFITH,
LUCY A. VAN COURT.